A. BLACKBURN.
COMBINED BUMPER AND BLIND FOR ANIMALS.
APPLICATION FILED OCT. 25, 1912.
1,057,615.
Patented Apr. 1, 1913.
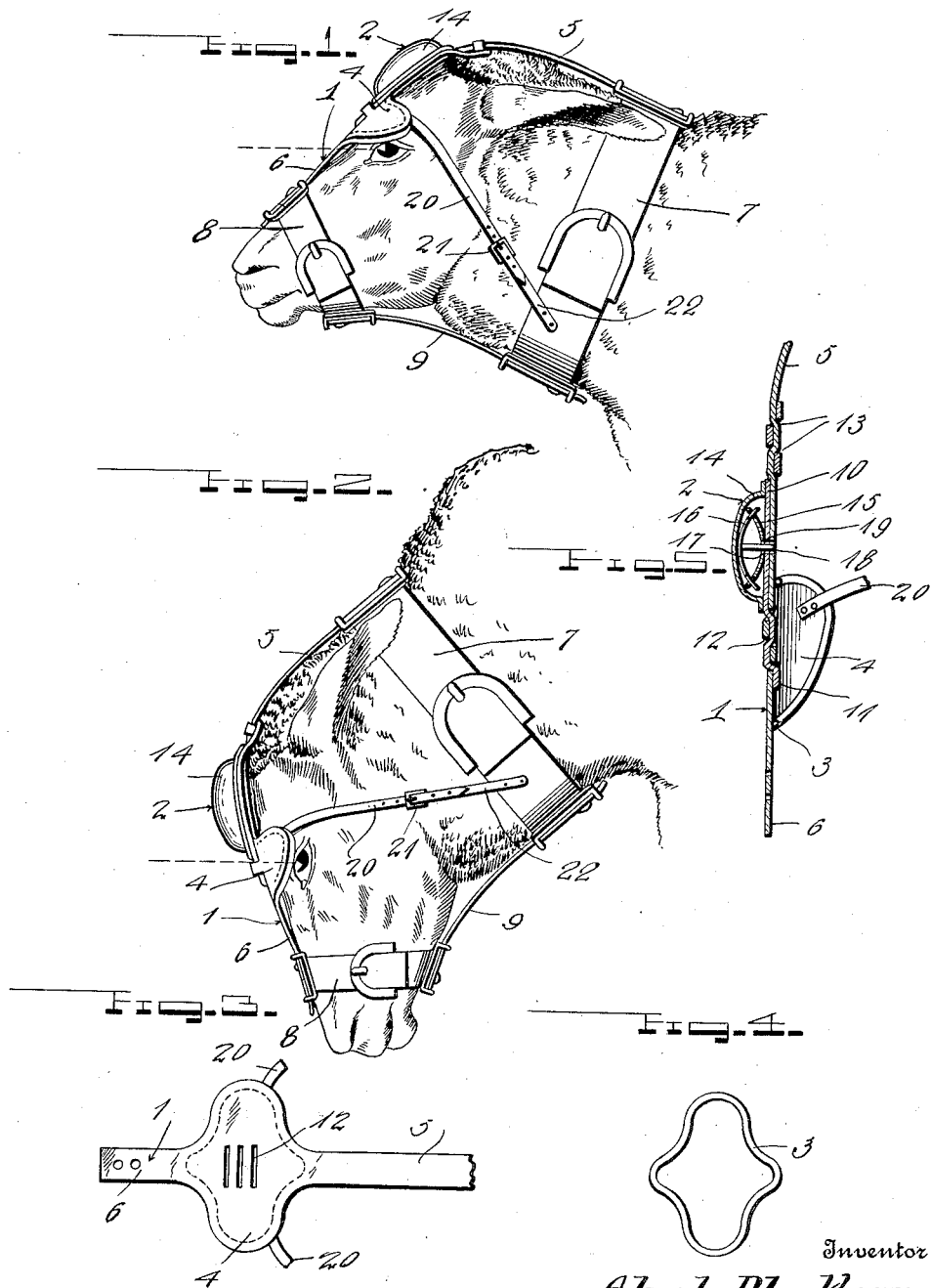

UNITED STATES PATENT OFFICE.

ALVAH BLACKBURN, OF ALUM BANK, PENNSYLVANIA.

COMBINED BUMPER AND BLIND FOR ANIMALS.

1,057,615.  Specification of Letters Patent.  Patented Apr. 1, 1913.

Application filed October 25, 1912. Serial No. 727,816.

*To all whom it may concern:*

Be it known that I, ALVAH BLACKBURN, a citizen of the United States, residing at Alum Bank, in the county of Bedford and State of Pennsylvania, have invented certain new and useful Improvements in Combined Bumpers and Blinds for Animals; and I do declare the following to be a full, clear, and exact description of the invention, such as will enable others skilled in the art to which it appertains to make and use the same.

This invention relates to improvements in bumpers and blinds for animals, and is particularly designed for use on sheep.

One object of the invention is to provide a bumper which may be readily applied to and worn without discomfort by the animal to which it is attached; and having means which, while not interfering with the vision of the animal under normal conditions, will when the animal's head is lowered in the act of butting or charging an adversary or other object, obscure the latter from the animal's sight, thus confusing and causing the animal to stop.

Another object is to improve the bumper shown in United States Patent No. 915,409, granted to me March 16th, 1909, whereby the bumper shown in said patent is rendered more efficient and serviceable.

With these and other objects in view, the invention consists of certain novel features of construction, combination and arrangement of parts, as will be hereinafter described and claimed.

In the accompanying drawings:—Figure 1 is a side view of a sheep's head illustrating the position of the bumper when the head is in a normal position. Fig. 2 is a similar view showing the position of the bumper when the animal's head is lowered for charging. Fig. 3 is a plan view of the blind member of the device. Fig. 4 is a similar view of the wire frame of the blind. Fig. 5 is a central longitudinal section of the bumper removed from the animal's head.

Referring more particularly to the drawings 1 denotes the blind and 2 denotes the bumper which is detachably connected to the blind in a manner hereinafter described. The blind comprises a wire frame 3 which is preferably of the shape shown in Fig. 4 of the drawing and is provided with a covering 4 of leather or other suitable material which when placed in position on the animal's head obscures the vision of the animal when the head is lowered in the act of charging or butting. The covering 4 may be secured to the frame 3 in any suitable manner. On the upper edge of the blind is an upper attaching strap 5 and on the lower edge of the blind is a lower attaching strap 6. The straps 5 and 6 are preferably formed integral with the leather covering 4 of the blind as shown. The upper strap 5 extends upwardly over the top of the animal's head and upper portion of the neck and is pivotally or otherwise secured to a collar 7 which is buckled around the animal's neck as shown. The lower strap 6 extends downwardly a short distance and is connected by a buckle or other suitable means a nose strap 8 which is buckled around the nose of the animal and which is preferably connected at its lower side to the lower side of the collar 7 by a throat strap 9 whereby said nose piece and collar are held in proper relative positions on the animal's nose and neck. When thus secured to the animal's head the laterally projecting ends of the blind will be in such position that when the head is lowered for charging or butting an adversary the forward view of the animal will be obstructed, thus confusing the animal and discouraging any further attempt to charge or butt.

In connection with the blind I also preferably employ the bumper 2 whereby should the blind fail to stop the charge of the animal the action of the bumper will inflict such punishment upon the animal's head as will cause it to desist or refrain from further butting. The bumper 2 comprises a base member 10 formed of leather or other suitable material and having on its lower end a short extension or strap 11 which is engaged with a series of slits 12 formed in the center of the covering 4 of the blind whereby said strap is securely but detachably fastened to the blind. The upper end of the base member 10 may be detachably secured to the upper strap 5 of the blind in any suitable manner and is here shown as having a series of slits 13 with which the strap 5 is engaged and by means of which the upper portion of the bumper is detachably secured to the blind. Secured to the upper side of the base member 10 of the bumper is a casing 14 of leather or other flexible material and between said casing 14 and the base member 10 are arranged bowed leaf springs 15 and 16. The lower spring 15 has in its ends slots with which the reduced ends of the upper spring 16 are slidably engaged. In the center of the lower spring 15 is an aperture 17 with which is engaged a pin 18 carried by and projecting inwardly from the outer spring 16 as shown. The pin 18 is held in a retracted position by the action of the spring 16 and the point of the pin is normally disposed in an aperture 19 in the base member 10 of the bumper. When pressure is applied to the casing 14 and the springs therein the pin 18 will be forced inwardly through the aperture 19 in the base member of the bumper and through the strap 5 of the blind and will be made to prick the head of the animal thus causing the latter to stop butting.

In order to more firmly hold the blind and bumper in position on the head of the animal, I also preferably provide side straps 20 the upper ends of which are secured to the outer edges of the laterally projecting ends of the blind, while their lower ends are adjustably engaged with buckles 21 carried by short strap sections 22 secured to the opposite sides of the collar 7 as shown.

It will be noted that the blind when constructed and arranged as herein shown and described will not interfere with the vision of the animal when the head is raised or carried in a normal position, but when the head is lowered, the blind will form an obstruction to the forward vision of the animal and it will be confused in moving forwardly and thus discouraged and caused to refrain from butting or charging. However, if the animal is sufficiently aroused to blindly continue charging and to come into contact with an adversary or other object the engagement of the bumper 2 with the object will project the pin 18 in the manner described and thus prick the head of the animal which will stop any further disposition to butt. It may be found that some animals having a milder temperament than others will not require the bumper and that the blind will be sufficient to deter any inclination of the animal to charge or butt, therefore I have herein shown and described the bumper as being detachable to permit the same to be removed from the blind if desired.

From the foregoing description taken in connection with the accompanying drawings, the construction and operation of the invention will be readily understood without requiring a more extended explanation.

Various changes in the form, proportion and the minor details of construction may be resorted to without departing from the principle or sacrificing any of the advantages of the invention as claimed.

Having thus described my invention, what I claim is:

1. In an attachment of the character described, the combination with a blind having straps projecting upwardly and downwardly therefrom; of a collar to which the upwardly projecting strap is attached, a nose strap to which the downwardly projecting strap is attached, a throat strap connecting the bottom of the collar with the bottom of the nose strap, side straps projecting downwardly from the edges of said blind, short strap sections projecting upwardly from said collar, and a buckle connecting each section with the lower end of the adjacent side strap.

2. In an attachment of the character described, the combination with a blind having transverse slits through its body and upwardly and downwardly projecting straps leading from it, and a harness connected with said straps for holding the blind on the head of an animal; of a bumper including a flexible base member having transverse slits in its upper portion through which said upper strap is led and a strap extending from its lower edge and let through said slits in the blind whereby said bumper is detachably connected with said blind, for the purpose set forth.

3. In an attachment of the character described, a blind comprising a suitably shaped frame, a covering secured thereon, upper and lower extensions formed on said covering to provide attaching straps, collar and nose straps adapted to be engaged respectively with the neck and nose of the animal, buckles to connect the ends of said blind attaching straps with said collar and nose straps whereby the blind is held in operative position on the head of the animal, and a bumper detachably secured to said blind and adapted to prick the animal when brought into engagement with an obstruction.

In testimony whereof I have hereunto set my hand in presence of two subscribing witnesses.

ALVAH BLACKBURN.

Witnesses:
 GEORGE ROGERS,
 W. A. McGREGOR.